(12) United States Patent
Wang et al.

(10) Patent No.: US 11,590,455 B2
(45) Date of Patent: Feb. 28, 2023

(54) HIGH-PERFORMANCE THIN-FILM COMPOSITE POLYAMIDE MEMBRANE UPCYLCLED FROM BIOPOLYMER-FOULED SUBSTRATES AND PREPARATION METHOD THEREOF

(71) Applicants: Tongji University, Shanghai (CN); Tianjin Polytechnic University, Tianjin (CN)

(72) Inventors: Zhiwei Wang, Shanghai (CN); Ruobin Dai, Shanghai (CN); Hongwei Zhang, Tianjin (CN); Liang Wang, Tianjin (CN); Hongyi Han, Shanghai (CN); Tianlin Wang, Shanghai (CN)

(73) Assignees: Tongji University, Shanghai (CN); Tianjin Polytechnic University, Tianjin (CN)

( * ) Notice: Subject to any disclaimer, the term of this patent is extended or adjusted under 35 U.S.C. 154(b) by 5 days.

(21) Appl. No.: 15/930,468

(22) Filed: May 13, 2020

(65) Prior Publication Data
US 2021/0213392 A1    Jul. 15, 2021

(30) Foreign Application Priority Data
Jan. 14, 2020    (CN) .......................... 202010035652.4

(51) Int. Cl.
*B01D 67/00* (2006.01)
*B01D 69/12* (2006.01)
*B01D 71/56* (2006.01)

(52) U.S. Cl.
CPC ..... *B01D 67/0006* (2013.01); *B01D 67/0095* (2013.01); *B01D 69/122* (2013.01); *B01D 71/56* (2013.01); *B01D 2321/16* (2013.01)

(58) Field of Classification Search
CPC ............ B01D 67/0006; B01D 67/0095; B01D 69/122; B01D 71/56; B01D 2321/16; B01D 69/12; B01D 67/0002
See application file for complete search history.

(56) References Cited

FOREIGN PATENT DOCUMENTS

| CN | 105727772 A | * | 7/2016 |
| CN | 110201544 A | * | 9/2019 |

OTHER PUBLICATIONS

Verkman, A, et al, Structrue and function of aquaporin water channels, 2000, American Journal of Physiology, 278, F13-F28, https://doi.org/10.1152/ajprenal.2000.278.1.F13 (Year: 2000).*

(Continued)

*Primary Examiner* — Bradley R Spies
*Assistant Examiner* — Jeannie McDermott
(74) *Attorney, Agent, or Firm* — Bayramoglu Law Offices LLC

(57) ABSTRACT

A high-performance thin-film composite polyamide membrane upcycled from a substrate fouled with a biopolymer and a preparation method thereof are provided. The method includes fouling the substrate preferably with the biopolymer to obtain a composite of the substrate and a biopolymer foulant layer; then immersing the composite into a first solution formed by dissolving a polyamine monomer in water, followed by taking the composite out of the first solution and removing excess droplets from a surface of the composite; then immersing the composite treated in the previous step into a second solution formed by dissolving an acyl chloride monomer in n-hexane for interfacial polymerization to form a rejection layer on the surface of the composite; and after completion of the reaction, taking the composite out of the second solution, followed by drying and heat treatment, to obtain the target polyamide membrane.

20 Claims, 4 Drawing Sheets

(56) References Cited

OTHER PUBLICATIONS

Shakeri, A. et al, Chitosan-based thin active layer membrane for forward osmosis desalination, Carbohydrate Polymers 174 (2017) 658-668 (Year: 2017).*
Moradi, M. et al., End-of-life RO membranes recycling: Reuse as NF membranes by polyelectrolyte layer-by-layer deposition, 2019, Journal of Membrane Science, 584, 300-308. (Year: 2019).*
Garcia-Pacheco, R. et al., Validation of recycled membranes for treating brackish water at pilot scale, 2018, Desalination 433 (2018) 199-208 (Year: 2018).*
Guan, Y, et al., Improved PVDF membrane performance by doping extracellular polymeric substances of activated sludge, 2017, Water Research, 113, 89-96. http://dx.doi.org/10.1016/j.watres.2017.01.057 (Year: 2017).*
Guan, Yan-Fang, et.al, Modification of forward osmosis membrane with naturally available humic acid: Towards simultaneously improved filtration performance and antifouling properties, Jul. 2019, Environment International, 131, https://doi.org/10.1016/j.envint.2019.105045 (Year: 2019).*
Khorshidid, T, et. al, Thin film composite polyamide membranes: parametric study on the influence of synthesis conditions, 2015, Royal Society of Chemistry, RSC Advances, 2015, 5, 54985-54997 (Year: 2015).*
Chi, Xiang-Yu, Impact of Cross-Linked Chitosan Sublayer Structure on the Performance of TFC FO PAN Nanofiber Membranes DOI: 10.1021/acsomega.8b01201, ACS Omega, 2018, vol. 3(10), p. 13009-13019 (Year: 2018).*
Ruobin Dai, et al., Fouling is the beginning: upcycling biopolymerfouled substrates for fabricating high-permeance thin-film composite polyamide membranes, Green Chemistry, 2021, pp. 1013-1025, vol. 23.

* cited by examiner 

HIGH-PERFORMANCE THIN-FILM COMPOSITE POLYAMIDE MEMBRANE UPCYLCLED FROM BIOPOLYMER-FOULED SUBSTRATES AND PREPARATION METHOD THEREOF

CROSS REFERENCE TO THE RELATED APPLICATIONS

This application is based upon and claims priority to Chinese Patent Application No. 202010035652.4, filed on Jan. 14, 2020, the entire contents of which are incorporated herein by reference.

TECHNICAL FIELD

The present invention relates to a thin-film composite polyamide membrane and a preparation method thereof, more specifically to a high-performance thin-film composite polyamide membrane upcycled from biopolymer-fouled substrates and a preparation method thereof, and belongs to the field of membrane separation technology.

BACKGROUND

Membrane separation technology has been widely used in areas such as seawater desalination, sewage treatment and water reuse, chemical separation or the like, and the demand for the use of membrane separation technology is still growing worldwide. One of the main problems with the membrane separation technology is membrane fouling. The membrane fouling may result in a decrease in water flux of the membranes and an increase in energy consumption for operation. Although the flux can be recovered to a certain extent after proper cleaning, due to the presence of irreversible or unrecoverable portions in the foulants, it is difficult for membrane assemblies to recover the flux to the desired level after certain cleaning cycles, resulting in the discarding of the membrane materials. The majority of the membrane materials in the market today are those based on polymers produced by the petrochemical industry. The treatment and disposal processes for those membrane materials generally include incineration or landfilling due to the properties of their materials, which places a great burden on the environment.

Recycling of the membrane materials is a green way to solve the treatment and disposal of the membrane materials. At present, some scientists have developed a technology where fouled/discarded high-pressure membranes (nanofiltration/reverse osmosis membranes) are treated by physical and chemical methods, and then "downcycled" into corresponding membrane materials for use (for example, reverse osmosis downcycled into nanofiltration and nanofiltration downcycled into ultrafiltration). However, how to prepare and "upcycle" low-pressure membranes (for microfiltration or ultrafiltration) fouled/discarded due to membrane fouling into high-pressure membrane materials for further use remains an unexplored field in the industry.

One of the main contributors to the membrane fouling of the low-pressure membranes is biopolymers. For example, the main foulants include polysaccharides, proteins and humic acids from aqueous system during typical filtration of surface water by the low-pressure membranes; extracellular polymeric substances secreted by microorganisms in engineered membrane bioreactors commonly used in wastewater treatment; and also, target compounds such as polysaccharides or proteins in feed liquid in the process of chemical separation and purification. Notably, the low-pressure membranes (for microfiltration or ultrafiltration) are generally also substrates for preparing the high-pressure membranes via the typical reaction of interfacial polymerization. Therefore, regarding the concerns of recycling of fouled/discarded low-pressure membrane materials, it is of great significance to develop and prepare a high-performance thin-film composite polyamide membrane upcycled from biopolymer-fouled substrates, taking the biopolymer as typical foulants to membranes.

SUMMARY

In order to solve the problems in the prior art, the present invention provides a high-performance thin-film composite polyamide membrane upcycled from biopolymer-fouled substrates and a preparation method thereof. The method according to the present invention includes fouling the substrate with the biopolymer to obtain a composite of the substrate and a fouling layer, and then generating a polyamide rejection layer on a surface of the composite by interfacial polymerization. In the present invention, the membrane fouling with the biopolymer is innovatively used as a means for modifying the substrate. The thin-film composite polyamide membrane upcycled from the biopolymer-fouled substrates, which has a high flux and a high rejection rate, is prepared by improving reaction conditions of the interfacial polymerization. Thus, a green recycling chain is established between low-pressure membranes and high-pressure membranes, which provides an effective means to solve the problems of recycling of fouled/discarded low-pressure membranes.

In order to achieve the above technical objectives, the present invention provides the technical solutions as follows.

The present invention provides a method for preparing a high-performance thin-film composite polyamide membrane upcycled from biopolymer-fouled substrates, including the following steps:

(1) fouling the substrate with the biopolymer to obtain a composite of the substrate and a biopolymer foulant layer;

(2) dissolving a polyamine monomer in water to form a first solution, and then immersing the composite obtained in step (1) into the first solution, followed by taking the composite out of the first solution and removing excess droplets from the surface of the composite; and (3) dissolving an acyl chloride monomer in n-hexane to form a second solution, then immersing the composite treated in step (2) into the second solution for an interfacial polymerization reaction to form a polyamide rejection layer on the surface of the composite, and after completion of the reaction, removing the composite from the second solution, followed by drying and heat treatment, to obtain the target thin-film composite polyamide membrane.

Preferably, in step (2), the polyamine monomer includes at least one of piperazine, m-phenylenediamine and p-phenylenediamine, and the first solution contains the polyamine monomer at a mass concentration of 0.05%-1.0%.

Preferably, in step (3), the acyl chloride monomer includes at least one of trimesoyl chloride and terephthaloyl chloride, and the second solution contains the acyl chloride monomer at a mass concentration of 0.04%-0.8%.

Preferably, in step (3), the interfacial polymerization reaction is performed for a period of 30 seconds.

Preferably, in step (3), the drying is performed for a period of 0.5-2 minutes, and the heat treatment is performed at a temperature of 40° C.-95° C. for a period of 2-10 minutes.

Preferably, in step (1), the fouling of the substrate with the biopolymer includes the specific step of vacuum-filtering a 10 mg/L, of aqueous solution of the biopolymer onto the substrate.

Preferably, in step (1), the substrate has a material including any one of polysulfone, polyethersulfone, polyvinylidene fluoride, polytetrafluoroethylene, and polyacrylonitrile, or a combination of two or more thereof.

Preferably, in step (1), the substrate has a pore diameter of 0.005-0.5 μm.

Preferably, in step (1), the biopolymer includes any one substance of a polysaccharide, a protein, a humic acid, an extracellular polymeric substance, and a chelate of the foregoing substances with a metal ion.

The present invention provides a thin-film composite polyamide membrane prepared by the above method.

From the above description, it can be seen that the present invention has the following advantages:

1. It is traditionally considered that the fouling of the membrane with the biopolymer has a negative effect. However, in the present invention, the fouling with the biopolymer is innovatively used as a means for modifying the substrate. The substrate fouled with the biopolymer act as a novel platform for the interfacial polymerization, whose nature is well regulated due to the fouling (modification). At the same time, due to the introduction of the biopolymer, the substrate also has a greater adsorption capacity for the polyamine monomer/aqueous solution than a clean substrate. Therefore, the polyamide rejection layer formed on the biopolymer-fouled substrate has a higher degree of cross-linking, thereby ensuring the rejection performance of the polyamide separation membrane. In addition, as the biopolymer plays a flexible bridging role between the polyamide rejection layer and the substrate, the polyamide on the non-porous region of the original substrate has a greatly enhanced water permeability, effectively increasing the water permeability of the as-formed thin film composite polyamide membrane.

2. The method of the present invention has advantages such as simple operation, low cost and environmental friendliness. The method of the present invention establishes the green recycling chain between low-pressure membranes and high-pressure membranes, thereby providing an effective means for solving the problems of recycling of fouled/discarded low-pressure membranes.

DETAILED DESCRIPTION OF THE EMBODIMENTS

The features of the present invention are further described below with reference to embodiments, without any limitation on the claims of the present invention.

Embodiment 1

Preparation of a high-performance thin-film composite polyamide membrane upcycled from a substrate fouled with a polysaccharide.

Figure 1A:
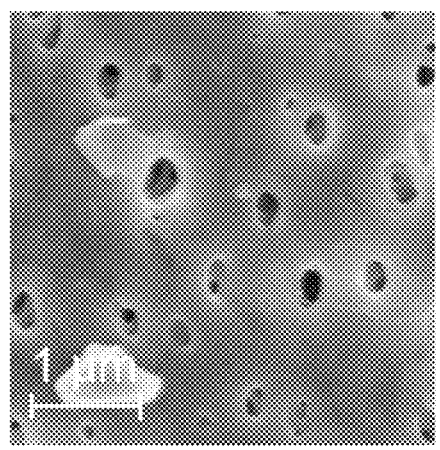
FIG. 1A shows a scanning electron microscope characterization image of the fouled substrate in Embodiment 1.

(1) An 80 mL of 10 mg/L aqueous solution of sodium alginate was formulated and then vacuum-filtered onto a circular polyethersulfone microfiltration membrane with a diameter of 4 cm (pore diameter: 0.22 μm) to obtain the substrate fouled with the polysaccharide, that is, a composite of the substrate and a polysaccharide foulant layer (as shown in FIG. 1A, the surface of the substrate has been successfully fouled with the polysaccharide).

(2) Piperazine was dissolved in water to form a first solution at a mass concentration of 0.05%, and then, the composite obtained in step (1) was immersed into the first solution for 2 minutes, followed by taking the composite out of the first solution and removing excess droplets from the surface of the composite by a rubber roller.

Figure 2A:
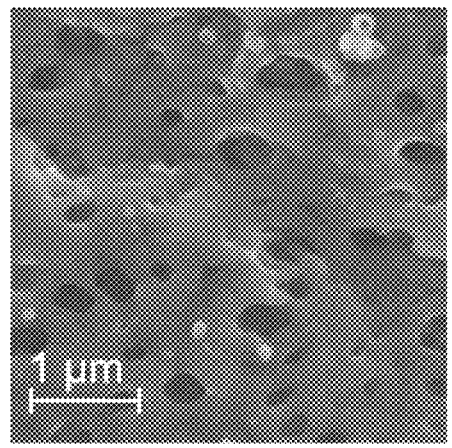
FIG. 2A shows a scanning electron microscope characterization image of the thin-film composite polyamide membrane prepared in Embodiment 1.

(3) Trimesoyl chloride was dissolved in n-hexane to form a second solution at a mass concentration of 0.04%, and then, the composite treated in step (2) was immersed into the second solution for interfacial polymerization reaction for a period of 30 seconds to form a polyamide rejection layer on the surface of the composite, and after the reaction was completed, the membrane was taken out of the second solution and dried in air for 1 minute, and cured in an oven at 60° C. for 5 minutes, to obtain the target thin-film composite polyamide membrane. It was observed by a scanning electron microscope that the thin rejection layer of polyamide had been successfully formed on the surface of the substrate fouled with the polysaccharide, as shown in FIG. 2A.

Embodiment 2

Preparation of a high-performance thin-film composite polyamide membrane upcycled from a substrate fouled with a protein.

Figure 1B:
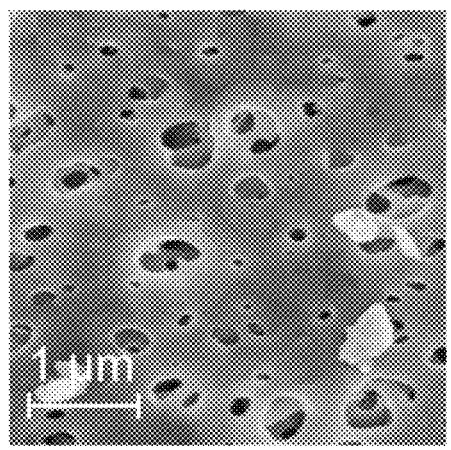
FIG. 1B shows a scanning electron microscope characterization image of the fouled substrate in Embodiment 2.

(1) An 80 mL of 10 mg/L aqueous solution of bovine serum albumin was vacuum-filtered onto a circular polyethersulfone microfiltration membrane with a diameter of 4 cm (pore diameter: 0.22 μm) to obtain the substrate fouled with the protein, that is, a composite of the substrate and a protein foulant layer (as shown in FIG. 1B, the surface of the substrate has been successfully fouled with the protein).

(2) Piperazine was dissolved in water to form a first solution at a mass concentration of 0.05%, and then, the composite obtained in step (1) was immersed into the first solution for 2 minutes, followed by taking the composite out of the first solution and removing excess droplets from the surface of the composite by a rubber roller.

Figure 2B:
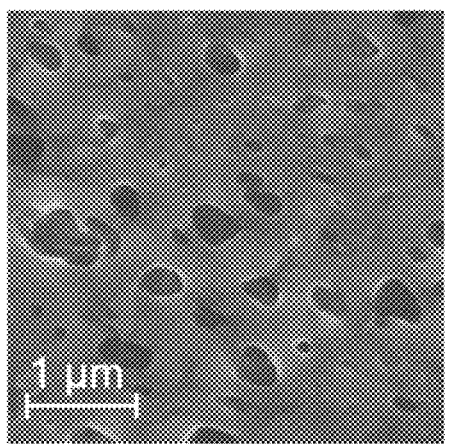
FIG. 2B shows a scanning electron microscope characterization image of the thin-film composite polyamide membrane prepared in Embodiment 2.

(3) Trimesoyl chloride was dissolved in n-hexane to form a second solution at a mass concentration of 0.04%, and then, the composite treated in step (2) was immersed into the second solution for interfacial polymerization reaction for a period of 30 seconds to form a polyamide rejection layer on the surface of the composite, and after the reaction was completed, the membrane was taken out of the second solution and dried in air for 1 minute, and cured in an oven at 60° C. for 5 minutes, to obtain the target thin-film composite polyamide membrane. It was observed by a scanning electron microscope that the thin rejection layer of polyamide had been successfully formed on the surface of the substrate fouled with the protein, as shown in FIG. 2B.

Embodiment 3

Preparation of a high-performance thin-film composite polyamide membrane upcycled from a substrate fouled with a humic acid.

Figure 1C:
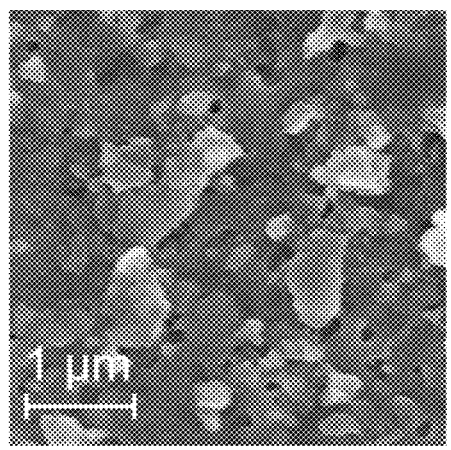
FIG. 1C shows a scanning electron microscope characterization image of the fouled substrate in Embodiment 3.

(1) An 80 mL of 10 mg/L aqueous solution of humic acid was vacuum-filtered onto a circular polyethersulfone microfiltration membrane with a diameter of 4 cm (pore diameter: 0.22 μm) to obtain the substrate fouled with the humic acid, that is, a composite of the substrate and a humic acid foulant layer (as shown in FIG. 1C, the surface of the substrate has been successfully fouled with the humic acid).

(2) Piperazine was dissolved in water to form a first solution at a mass concentration of 0.05%, and then, the composite obtained in step (1) was immersed into the first solution for 2 minutes, followed by taking the composite out of the first solution and removing excess droplets from the surface of the composite by a rubber roller.

Figure 2C:
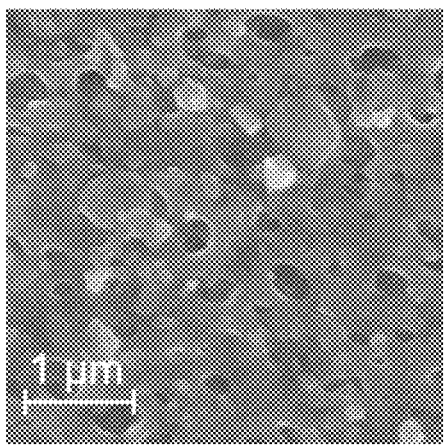
FIG. 2C shows a scanning electron microscope characterization image of the thin-film composite polyamide membrane prepared in Embodiment 3.

(3) Trimesoyl chloride was dissolved in n-hexane to form a second solution at a mass concentration of 0.04%, and then, the composite treated in step (2) was immersed into the second solution for interfacial polymerization reaction for a period of 30 seconds to form a polyamide rejection layer on the surface of the composite, and after the reaction was completed, the membrane was taken out of the second solution and dried in air for 1 minute, and cured in an oven at 60° C. for 5 minutes, to obtain the target thin-film composite polyamide membrane. It was observed by a scanning electron microscope that the thin rejection layer of polyamide had been successfully formed on the surface of the substrate fouled with the humic acid, as shown in FIG. 2C.

Embodiment 4

Preparation of a high-performance thin-film composite polyamide membrane upcycled from a substrate fouled with an extracellular polymeric substance.

Figure 1D:
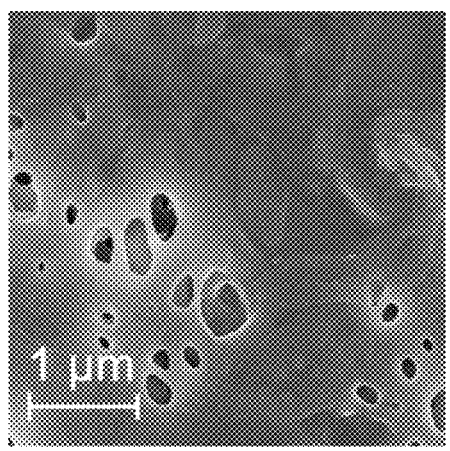
FIG. 1D shows a scanning electron microscope characterization image of the fouled substrate in Embodiment 4.

(1) The extracellular polymeric substance was extracted from a suspension of an activated sludge obtained from an aerobic tank of a sewage treatment plant in Shanghai by thermal extraction method, before diluting to 10 mg/L. 80 mL of 10 mg/L aqueous solution of extracellular polymeric substance was vacuum-filtered onto a circular polyethersulfone microfiltration membrane with a diameter of 4 cm (pore diameter: 0.22 μm) to obtain the substrate fouled with the extracellular polymeric substance, that is, a composite of the substrate and an extracellular polymeric substance foulant layer (as shown in FIG. 1D, the surface of the substrate has been successfully fouled with the extracellular polymeric substance).

(2) Piperazine was dissolved in water to form a first solution at a mass concentration of 0.05%, and then, the composite obtained in step (1) was immersed into the first solution for 2 minutes, followed by taking the composite out of the first solution and removing excess droplets from the surface of the composite by a rubber roller.

Figure 2D:
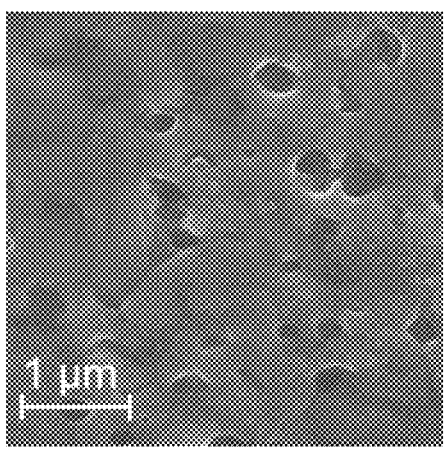
FIG. 2D shows a scanning electron microscope characterization image of the thin-film composite polyamide membrane prepared in Embodiment 4.

(3) Trimesoyl chloride was dissolved in n-hexane to form a second solution at a mass concentration of 0.04%, and then, the composite treated in step (2) was immersed into the second solution for interfacial polymerization reaction for a period of 30 seconds to form a polyamide rejection layer on the surface of the composite, and after the reaction was completed, the membrane was taken out of the second solution and dried in air for 1 minute, and cured in an oven at 60° C. for 5 minutes, to obtain the target thin-film composite polyamide membrane. It was observed by a scanning electron microscope that the thin rejection layer of polyamide had been successfully formed on the surface of the substrate fouled with the extracellular polymeric substance, as shown in FIG. 2D.

Comparative Example 1

Figure 1E:
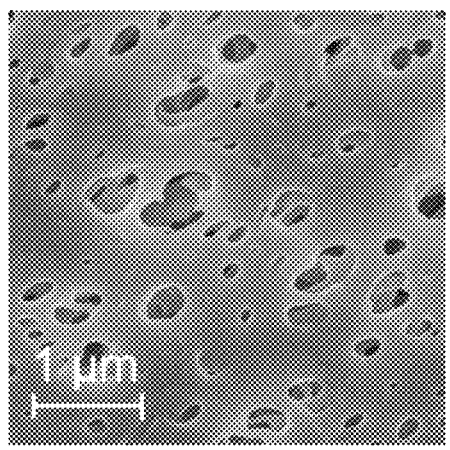
FIG. 1E shows a scanning electron microscope characterization image of the fouled substrate in Comparative Example 1.

(1) A clean polyethersulfone microfiltration membrane (pore diameter: 0.22 μm) was used as a substrate without any foulant on the surface of the substrate, as shown in FIG. 1E.

(2) Piperazine was dissolved in water to form a first solution at a mass concentration of 0.05%, and then, the substrate was immersed into the first solution for 2 minutes, followed by taking the substrate out of the first solution and removing excess droplets from the surface of the composite by a rubber roller.

Figure 2E:
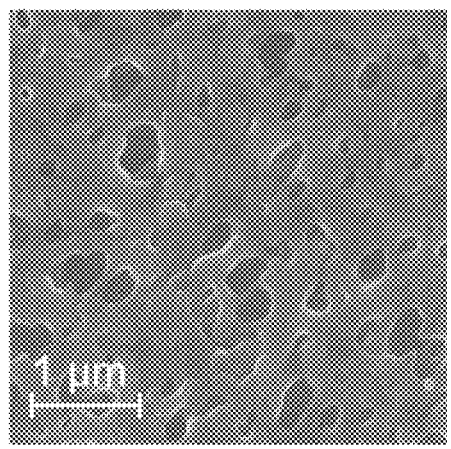
FIG. 2E shows a scanning electron microscope characterization image of the thin-film composite polyamide membrane prepared in Comparative Example 1.

(3) Trimesoyl chloride was dissolved in n-hexane to form a second solution at a mass concentration of 0.04%, and then, the composite treated in step (2) was immersed into the second solution for interfacial polymerization reaction for a period of 30 seconds to form a polyamide rejection layer on the surface of the composite, and after the reaction was completed, the membrane was taken out of the second solution and dried in air for 1 minute, and cured in an oven at 60° C. for 5 minutes, to obtain the control thin-film composite polyamide membrane. It was observed by a scanning electron microscope that the thin rejection layer of polyamide had been successfully formed on the surface of the substrate, as shown in FIG. 2E.

Experimental Example 1

The fouled substrates (composites) in Embodiments 1-4 and the clean substrate in Comparative Example 1 were tested for pure water permeability. The specific steps were as follows: vacuum filtration was performed at a water temperature of 25° C. to measure the time required for an equal volume of pure water to pass through the membranes; and then the time was converted to the pure water permeability of the substrate. The test results are shown in Table 1.

TABLE 1

| Pure water permeability of the substrates | |
|---|---|
| | Pure water permeability ($L\ m^{-2}\ h^{-1}\ bar^{-1}$) |
| Clean substrate in Comparative Example 1 | 10479.5 ± 127.8 |
| Fouled substrate in Embodiment 1 | 5847.5 ± 510.8 |
| Fouled substrate in Embodiment 2 | 7985.4 ± 839.4 |

TABLE 1-continued

Pure water permeability of the substrates

|  | Pure water permeability (L m$^{-2}$ h$^{-1}$ bar$^{-1}$) |
| --- | --- |
| Fouled substrate in Embodiment 3 | 1571.9 ± 403.2 |
| Fouled substrate in Embodiment 4 | 2145.5 ± 51.3 |

Table 1 shows that compared to the clean substrate (Comparative Example 1), the pure water permeability of the fouled substrates (Embodiments 1 to 4) decreased to a different extent. Among them, the humic acid fouling caused the greatest decrease in water permeability, followed by the extracellular polymeric substance fouling, and the protein fouling had the least effect on water permeability. Such different fouling effects may be related to the type of the biopolymers and the actual biopolymer loadings.

Experimental Example 2

The thin-film composite polyamide membranes prepared in Embodiments 1 to 4 and Comparative Example 1 were tested for water permeability and sodium sulfate rejection rate. After pre-compacting the membranes at an operating pressure of 7 bar for 4 hours, the test was performed under cross-flow filtration conditions with an operating pressure of 6 bar, a water temperature of 25° C., and a cross-flow rate of 20 cm/s by a device described in the literature [Environ. Sci. Technol. 2019, 53, 13776-13783], wherein the concentration of sodium sulfate was 10 mM. The test results are shown in Table 2.

TABLE 2

Performance of the thin-film composite polyamide membranes

| Polyamide membranes | Water permeability (L m$^{-2}$ h$^{-1}$ bar$^{-1}$) | Sodium sulfate rejection rate (%) |
| --- | --- | --- |
| Comparative Example 1 | 16.3 ± 0.8 | 91.6 ± 1.4 |
| Embodiment 1 | 28.3 ± 0.5 | 95.2 ± 0.6 |
| Embodiment 2 | 25.5 ± 1.2 | 95.1 ± 0.5 |
| Embodiment 3 | 31.9 ± 1.4 | 94.2 ± 2.7 |
| Embodiment 4 | 28.3 ± 1.0 | 95.1 ± 1.8 |

It can be seen from Table 2 that the polyamide membranes upcycled from the fouled substrates prepared in Embodiments 1 to 4 all have better water permeability and sodium sulfate rejection rate, compared to the polyamide membrane based on the clean substrate prepared in Comparative Example 1. Among them, compared with the polyamide membrane based on the clean substrate prepared in Comparative Example 1 (water permeability: 16.3 L m$^{-2}$ h$^{-1}$ bar$^{-1}$, and rejection rate: 91.6%), the polyamide membrane upcycled from the substrate fouled with the humic acid prepared in Embodiment 3 (water permeability: 31.9 L m$^{-2}$ h$^{-1}$ bar$^{-1}$, and sodium sulfate rejection rate: 94.2%) had an increase of 96% in water permeability and an increase of 2% in sodium sulfate rejection rate.

Therefore, compared with the thin-film composite polyamide membrane prepared with the clean substrate, the thin-film composite polyamide membrane upcycled from the substrate fouled with the biopolymer provided by the present invention has both significantly enhanced water permeability and sodium sulfate rejection rate.

It should be understood that the above specific description of the present invention is only used to illustrate the present invention and is not limited to the technical solutions described in the embodiments of the present invention. It should be understood by those of ordinary skill in the art that modifications or equivalent replacements can be made to the present invention to achieve the same technical effects, and all of the modifications and equivalent replacements fall within the protection scope of the present invention, as long as the needs of use are met.

What is claimed is:

1. A method for preparing a thin-film composite polyamide membrane upcycled from a substrate fouled with a biopolymer, comprising the following steps:
   (1) fouling a microfiltration membrane substrate or ultrafiltration membrane substrate with the biopolymer, which is a protein, a humic acid, or an extracellular polymeric substance, to obtain a composite of the microfiltration membrane substrate or ultrafiltration membrane substrate having a biopolymer foulant layer on a surface of the microfiltration membrane substrate or ultrafiltration membrane substrate;
   (2) dissolving a polyamine monomer in water to form a first solution, and then immersing the composite obtained in step (1) into the first solution, followed by taking the composite out of the first solution and removing excess droplets from a surface of the composite; wherein the polyamine monomer is at least one selected from the group consisting of piperazine, m-phenylenediamine, and p-phenylenediamine, and the first solution contains the polyamine monomer at a mass concentration of 0.05%-1.0%; and
   (3) dissolving an acyl chloride monomer in n-hexane to form a second solution, then immersing the composite treated in step (2) into the second solution for an interfacial polymerization reaction to form a polyamide rejection layer on a surface of the biopolymer foulant layer of the composite, and after completion of the interfacial polymerization reaction, taking the composite out of the second solution, followed by drying the composite and performing a heat treatment on the composite, to obtain the high-performance thin-film composite polyamide membrane.

2. The method according to claim 1, wherein in step (3), the acyl chloride monomer is at least one selected from the group consisting of trimesoyl chloride and terephthaloyl chloride, and the second solution contains the acyl chloride monomer at a mass concentration of 0.04%-0.8%.

3. The method according to claim 1, wherein in step (3), the interfacial polymerization reaction is performed for a period of 30 seconds.

4. The method according to claim 1, wherein in step (3), the drying is performed for a period of 0.5-2 minutes, and the heat treatment is performed at a temperature of 40° C.-95° C. for a period of 2-10 minutes.

5. The method according to claim 1, wherein in step (1), the fouling the substrate with the biopolymer comprises: vacuum-filtering a 10 mg/L of aqueous solution of the biopolymer onto the substrate.

6. The method according to claim 1, wherein in step (1), the substrate has a material of at least one selected from the group consisting of polysulfone, polyethersulfone, polyvinylidene fluoride, polytetrafluoroethylene, and polyacrylonitrile.

7. The method according to claim 1, wherein in step (1), the substrate has a pore diameter of 0.005-0.5 μm.

8. A thin-film composite polyamide membrane prepared by the method according to claim 1.

9. The thin-film composite polyamide membrane according to claim 8, wherein in step (3), the acyl chloride monomer is at least one selected from the group consisting of trimesoyl chloride and terephthaloyl chloride, and the second solution contains the acyl chloride monomer at a mass concentration of 0.04%-0.8%.

10. The thin-film composite polyamide membrane according to claim 8, wherein in step (3), the interfacial polymerization reaction is performed for a period of 30 seconds.

11. The thin-film composite polyamide membrane according to claim 8, wherein in step (3), 14 the drying is performed for a period of 0.5-2 minutes, and the heat treatment is performed at a temperature of 40° C.-95° C. for a period of 2-10 minutes.

12. The thin-film composite polyamide membrane according to claim 8, wherein in step (1), the fouling the substrate with the biopolymer comprises: vacuum-filtering a 10 mg/L of aqueous solution of the biopolymer onto the substrate.

13. The thin-film composite polyamide membrane according to claim 8, wherein in step (1), the substrate has a material of at least one selected from the group consisting of polysulfone, polyethersulfone, polyvinylidene fluoride, polytetrafluoroethylene, and polyacrylonitrile.

14. The thin-film composite polyamide membrane according to claim 8, wherein in step (1), the substrate has a pore diameter of 0.005-0.5 μm.

15. The thin-film composite polyamide membrane according to claim 8, wherein the first solution contains the polyamine monomer at a mass concentration of 0.05%.

16. The method according to claim 1, wherein the biopolymer is the extracellular polymeric substance.

17. The method according to claim 16, wherein the extracellular substance is extracted from a suspension of an activated sludge.

18. The method according to claim 1, wherein the biopolymer is the humic acid.

19. The method according to claim 1, wherein the biopolymer is the protein.

20. The method according to claim 19, wherein the protein is bovine serum albumin.

* * * * *